Jan. 12, 1937. W. H. ROBERTSON Re. 20,242
INTERNAL COMBUSTION ENGINE
Original Filed June 14, 1928
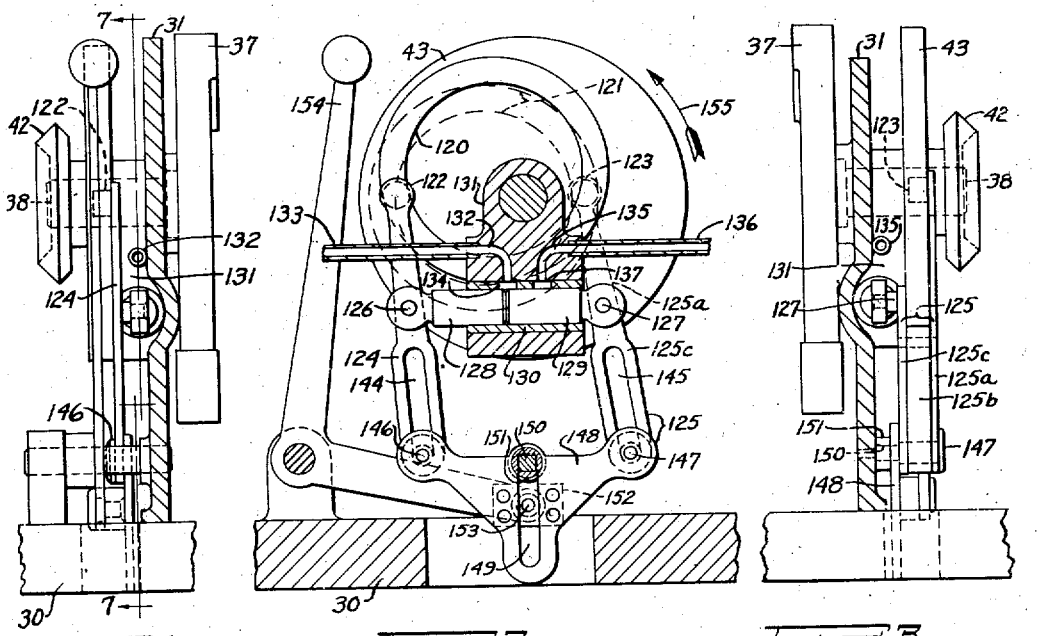
FIG. 1 FIG. 2 FIG. 3
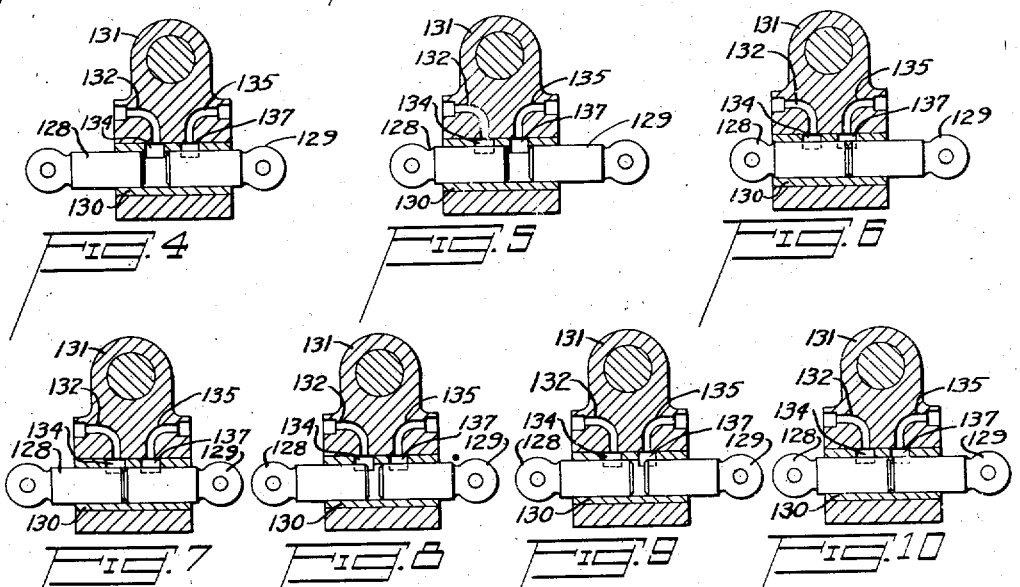
FIG. 4 FIG. 5 FIG. 6
FIG. 7 FIG. 8 FIG. 9 FIG. 10
INVENTOR
WILLIAM H. ROBERTSON
BY Francis H. Vandenwater and Wade Rounty
ATTORNEYS Reissued Jan. 12, 1937 Re. 20,242

UNITED STATES PATENT OFFICE 20,242

INTERNAL COMBUSTION ENGINE

William H. Robertson, Dayton, Ohio

Original No. 1,879,910, dated September 27, 1932, Serial No. 285,414, June 14, 1928. Reissue application September 25, 1934, Serial No. 745,480. Divided and this application for reissue, March 26, 1935, Serial No. 13,182

7 Claims. (Cl. 123—139)

This invention relates to fluid pumps and more particularly to fluid pumps of the valveless type, this invention being a division of my copending reissue application, Serial No. 745,480, filed September 25, 1934.

An object of the invention is to provide a novel means for pumping liquids and which is particularly useful in connection with internal combustion engines.

Another object of the invention is to provide a liquid pump means in which novel means are provided to deliver variable quantities of liquid from minimum to maximum capacity of the pump.

Another object of the invention is to provide a pump means having opposed pistons and independently operating means for timing the stroke of the pistons relative to one another.

Other and further objects and advantages of the present invention will be apparent from the following description of a preferred embodiment thereof, reference being made to the accompanying drawing.

In the drawing:

Fig. 1 is a left end elevation of the fuel pump and operating mechanism;

Fig. 2 is a sectional view taken on the line 7—7 of Fig. 1;

Fig. 3 is a right end elevation of the fuel pump shown in Fig. 2;

Fig. 4, Fig. 5 and Fig. 6 are sectional views of certain parts shown in Fig. 2, showing stages of operation of the pump when set to deliver a relatively large amount of fuel per engine cycle; and Fig. 7, Fig. 8, Fig. 9 and Fig. 10 are sectional views similar to those shown in Fig. 2, Fig. 4, Fig. 5, and Fig. 6 showing stages of pump operation when the pump is set to deliver a relatively small quantity of fuel per engine cycle.

As illustrated herein the invention is applied to an engine, a detailed description of which is given in my above-referred-to copending reissue application. Referring to Figs. 1 to 3, it will be seen that a base 30 supports the crank case 31 of the engine. A crank shaft 38 extends through said crank case and constitutes a direct drive for a fuel pump cam 43. This pump cam 43 is provided with races 120 and 121, cooperating with rollers 122 and 123, respectively, carried by levers 124 and 125 respectively. Levers 124 and 125 are connected by studs 126 and 127, respectively, with plungers 128 and 129, respectively, which slide within sleeve 130 mounted in pump frame 131 formed preferably integrally with a side wall of crank case 31.

Frame 131 is provided with fuel inlet passage 132 connected with inlet pipe 133 which leads from a fuel tank, not shown. Passage 132 leads into inlet port 134 provided in sleeve 130. Frame 131 is provided with fuel outlet passage 135 connected with fuel outlet pipe 136 which leads to the fuel nozzle described in my above-referred-to copending reissue application. Passage 135 leads out from outlet port 137 provided in sleeve 130.

Levers 124 and 125 are provided with slots 144 and 145, respectively, through which pass studs 146 and 147, respectively, carried by fulcrum plate 148. Plate 148 is provided with a slot 149 through which projects a stud 150 mounted upon a wall of crank case 31. A spacing washer 151 is located between crank case 31 and plate 148 to maintain plate 148 in proper alignment.

As lever 125 must cooperate with elements located on opposite sides of cam 43, said lever 125 is composed of section 125*a* carrying the cam roller 123, section 125*c* attached to plunger 129, and an intermediate connecting section 125*b*.

Plate 148 carries a block 152 to which is attached by means of stud 153 a bell-crank lever 154 which is rotatably supported upon the base 30.

The cycle of operations of the pump is shown in Figs. 2, 4, 5, and 6. In Fig. 2, the plungers 128 and 129 are located in touching relation opposite the fuel inlet port 134. Turning cam 43 in the direction of the arrow 155 causes the plungers first to be separated, as shown in Fig. 4, causing fuel to be sucked into sleeve 130. Further turning of cam 43 causes plungers 128 and 129 to move equal distances to the respective positions shown in Fig. 5 which are opposite outlet port 137. Further turning of cam 43 causes plungers 128 to 129 to come together as shown in Fig. 6, thereby causing the fuel to be forced out through pipe 136. When a revolution of cam 43 has been completed the pump plungers will be returned to the respective positions shown in Fig. 2. The pump cam 43 is timed so that fuel will begin to be ejected through pipe 136 at the end of the compression stroke, and is also timed to regulate the flow of fuel by movement of fuel pistons 128 and 129 in accordance with the flow of air passing through discs (not shown) as the engine pistons (not shown) separate.

The speed of the engine is controlled by moving lever 154 so as to raise or lower the fulcrum studs 146 and 147. If studs 146 and 147 be moved to the uppermost position much less fuel will be pumped from the fuel tank and ejected into pipe 136. With the fulcrum studs in such a position, the operation will be as illustrated in Figs. 7, 8, 9, and 10 showing positions of the plungers corresponding to Figs. 2, 4, 5, and 6 respectively. It will be observed in Fig. 8 that the plungers are retracted to a lesser extent than in Fig. 4. Therefore a smaller amount of fuel is sucked into the pump and ejected when the plungers come together again as shown in Fig. 10.

While the form of mechanism herein shown and described constitutes a preferred form of embodiment of the invention, it is to be understood that other forms might be adopted, all coming within the scope of the claims which follow.

I claim:

1. A liquid pump comprising, a cylinder having inlet and outlet ports, a pair of pistons reciprocating in said cylinder, piston driving means including two cams, one for driving each piston independently and in timed relation to the other piston and means for varying, at will, the quantity of liquid pumped while maintaining the time relation of the different movements of said pistons in the cyclic operation thereof substantially constant.

2. A liquid pump comprising, inlet and outlet ports a predetermined distance apart, a pair of pistons reciprocating in said cylinder, piston driving means including two cams for driving the pistons independently and in timed relation to each other so as to separate the inner ends of the pistons adjacent to the inlet port a distance less than the distance between said ports, then to move the pistons in substantially constant spaced relation to bring their inner ends adjacent to the outlet port, then to bring the pistons relatively closer together, then to move the pistons in substantially constant spaced relation back to have their inner ends adjacent to the inlet port.

3. A liquid pump comprising, a cylinder having inlet and outlet ports spaced a predetermined distance apart, a pair of pistons reciprocating in said cylinder, driving means including an operating shaft and mechanism positively connecting each piston with said shaft for separating the inner ends of the pistons adjacent the inlet port a distance less than the distance between said ports, then moving the pistons in substantially constant spaced relation to positions adjacent the outlet port whereby to close off the inlet port and to open the outlet port, then moving the pistons together adjacent the outlet port, and then moving said pistons in substantially constant relation until the inner ends thereof are again adjacent the inlet port.

4. A liquid pump comprising, a cylinder having inlet and outlet ports, a pair of pistons reciprocating in said cylinder, driving means including an operating shaft and mechanism positively connecting each piston with said shaft for separating the inner ends of the pistons adjacent the inlet port, then moving the pistons in substantially spaced relation to positions adjacent the outlet port whereby to close off the inlet port and to open the outlet port, then moving the pistons together adjacent the outlet port, then moving said pistons in substantially constant relation until the inner ends thereof are again adjacent the inlet port, and means for adjusting, at will, the mechanism to vary the separation of the pistons while maintaining a time relation of the different movements of said pistons in the cyclic operation thereof substantially constant.

5. A liquid pump comprising, a cylinder having spaced-apart inlet and outlet ports, a pair of pistons reciprocating in said cylinder, driving means including an operating shaft and mechanism positively connecting each piston with the said shaft for moving the pistons apart a distance less than the distance between said ports to uncover the inlet port and to suck in liquid, for thereafter moving the pistons to transfer said liquid from the inlet port to the outlet port thereby closing off the inlet port and opening the exhaust port, and then moving the pistons together to squeeze the liquid out through the exhaust port.

6. A liquid pump comprising, a cylinder having inlet and outlet ports, a pair of pistons reciprocating in said cylinder, driving means including an operating shaft and mechanism positively connecting each piston with said shaft for moving the pistons apart to uncover the inlet port and to suck in liquid, for thereafter moving the pistons to transfer said liquid from the inlet port to the outlet port thereby closing off the inlet port and opening the exhaust port, then moving the pistons together to squeeze the liquid out through the exhaust port, and means for adjusting, at will, said mechanism to adjust the last mentioned movement of said pistons to vary the quantity of liquid ejected through the exhaust port while maintaining the time relation of the different movements of said pistons in the cyclic operation thereof substantially constant.

7. A liquid pump comprising, a cylinder having inlet and outlet ports spaced a predetermined distance apart, a pair of pistons reciprocating in said cylinder, driving means including an operating shaft and mechanism positively connecting each piston with said shaft for separating the inner ends of the pistons adjacent the inlet port a distance less than the distance between said ports, then moving the pistons in substantially constant spaced relation to positions adjacent the outlet port whereby to close off the inlet port and to open the outlet port, then moving the pistons together adjacent the outlet ports, then moving said pistons in substantially constant relation until the inner ends thereof are again adjacent the inlet port, and means for adjusting, at will, the mechanism to vary the separation of the pistons while maintaining the time relation of the different movements of said pistons in the cyclic operation thereof substantially constant.

WILLIAM H. ROBERTSON.